United States Patent
Stephenson et al.

(10) Patent No.: US 11,514,168 B2
(45) Date of Patent: Nov. 29, 2022

(54) ACTIVE ATTESTATION OF EMBEDDED SYSTEMS

(71) Applicant: Government of the United States, as represented by the Secretary of the Air Force, Wright-Patterson AFB, OH (US)

(72) Inventors: Mark M. Stephenson, New Carlisle, OH (US); Patrick Reber, Dayton, OH (US); Patrick J. Sweeney, Beavercreek, OH (US); Scott Graham, Beavercreek, OH (US)

(73) Assignee: United States of America as represented by the Secretary of the Air Force, Wright-Patterson AFB, OH (US)

( * ) Notice: Subject to any disclaimer, the term of this patent is extended or adjusted under 35 U.S.C. 154(b) by 32 days.

(21) Appl. No.: 17/341,575

(22) Filed: Jun. 8, 2021

(65) Prior Publication Data

US 2021/0294897 A1    Sep. 23, 2021

Related U.S. Application Data

(62) Division of application No. 16/248,024, filed on Jan. 15, 2019, now Pat. No. 11,086,997.

(Continued)

(51) Int. Cl.
*G06F 21/00* (2013.01)
*G06F 21/57* (2013.01)
(Continued)

(52) U.S. Cl.
CPC .......... *G06F 21/572* (2013.01); *G06F 9/4401* (2013.01); *G06F 21/64* (2013.01);
(Continued)

(58) Field of Classification Search
CPC ...... G06F 21/572; G06F 21/64; G06F 9/4401; G06F 21/76; G06F 2221/033; H04L 9/088
See application file for complete search history.

(56) References Cited

U.S. PATENT DOCUMENTS 7,840,763 B2 * 11/2010 Murotake ........... G06F 12/1416
   726/17
9,177,153 B1 * 11/2015 Perrig .................... G06F 21/57
(Continued)

FOREIGN PATENT DOCUMENTS

CN      105308612 A  *  2/2016  ............ G06F 21/51
WO   WO-2012039726 A1 *  3/2012  ............ G06F 21/50
(Continued)

OTHER PUBLICATIONS

Lebedev et al., "Invited Paper: Secure Boot and Remote Attestation in the Sanctum Processor", 2018 IEEE 31st Computer Security Foundations Symposium (CSF), Date of Conference: Jul. 9-12 (Year: 2018).*

(Continued)

*Primary Examiner* — Morshed Mehedi
(74) *Attorney, Agent, or Firm* — AFMCLO/JAZ; Jeffrey R Moore (57) ABSTRACT

An active attestation apparatus verifies at runtime the integrity of untrusted machine code of an embedded system residing in a memory device while it is being run/used with while slowing the processing time less than other methods. The apparatus uses an integrated circuit chip containing a microcontroller and a reprogrammable logic device, such as a field programmable gate array (FPGA), to implement software attestation at runtime and in less time than is typically possible with comparable attestation approaches, while not requiring any halt of the processor in the microcontroller. The reprogrammable logic device includes func- (Continued)

tionality to load an encrypted version of its configuration and operating code, perform a checksum computation, and communicate with a verifier. The checksum algorithm is preferably time optimized to execute computations in the reprogrammable logic device in the minimum possible time.

13 Claims, 3 Drawing Sheets

Related U.S. Application Data (60) Provisional application No. 62/635,204, filed on Feb. 26, 2018.

(51) Int. Cl.
  G06F 9/4401 (2018.01)
  G06F 21/76 (2013.01)
  H04L 9/08 (2006.01)
  G06F 21/64 (2013.01)

(52) U.S. Cl.
  CPC ............... G06F 21/76 (2013.01); H04L 9/088 (2013.01); *G06F 2221/033* (2013.01)

(56) References Cited

U.S. PATENT DOCUMENTS

| | | | |
|---|---|---|---|
| 9,575,768 B1* | 2/2017 | Kim | G06F 9/4401 |
| 2012/0331550 A1* | 12/2012 | Raj | G06F 21/575 |
| | | | 726/22 |
| 2014/0258700 A1* | 9/2014 | England | G06F 21/572 |
| | | | 713/2 |
| 2014/0259117 A1* | 9/2014 | Wachendorf | G06F 21/57 |
| | | | 726/4 |
| 2015/0378744 A1* | 12/2015 | Gschwind | G06F 9/4408 |
| | | | 713/2 |
| 2017/0147814 A1 | 5/2017 | Cui | |
| 2017/0214541 A1* | 7/2017 | Brun | H04L 12/2803 |
| 2018/0375662 A1* | 12/2018 | Domke | G06F 3/0679 |
| 2019/0129638 A1* | 5/2019 | Murali | G06F 3/0679 |
| 2019/0340379 A1* | 11/2019 | Beecham | H04L 9/3239 |

FOREIGN PATENT DOCUMENTS

| | | |
|---|---|---|
| WO | 2012123400 A1 | 9/2012 |
| WO | 2016181152 A1 | 11/2016 |
| WO | 2017058577 A1 | 4/2017 |

OTHER PUBLICATIONS

R.V. Steiner, et al.; Attestation in Wireless Sensor Networks: a Survey; ACM Computing Surveys, vol. V, No. N, Article A, Publication date Jan. 2015.

P. Reber, et al.; Evaluating System on a Chip Design Security; Journal of Information Warfare, 16(3), pp. 63-78, Apr. 2017.

P. Reber; Thesis: A Comprehensive Security Analysis of and an Implementation Framework for Embedded Software Attestation Methods Leveraging FPGA-Based System-On-A-Chip Architectures; Graduate School of Engineering and Management, Air Force Institute of Technology; pp. 1-112, Mar. 2017.

P. Reber, et al.; Security by Design in System on a Chip Applications; Proceedings of the 12th International Conference on Cyber Warfare and Security, pp. 275-284, Mar. 2-3, 2017.

A. Seshardri, et al.; SWATT: SoftWare-based ATTestation for Embedded Devices; Proceedings of the 2004 IEEE Symposium on Security and Privacy, pp. 1-11, May 12, 2004.

* cited by examiner

ACTIVE ATTESTATION OF EMBEDDED SYSTEMS

CROSS REFERENCE TO RELATED APPLICATIONS

This application is a divisional under 35 U.S.C. § 120 and claims priority to U.S. patent application Ser. No. 16/248,024 entitled "Active Attestation of Embedded Systems" filed 15 Jan. 2019, which pursuant to 37 C.F.R. § 1.78(a)(4), and the benefit of and priority to prior filed Provisional Application Ser. No. 62/635,204, filed 26 Feb. 2018, the contents of both are expressly incorporated herein by reference in their entirety.

GOVERNMENT INTEREST

The invention described herein may be manufactured and used by or for the Government of the United States for all government purposes without the payment of any royalty.

FIELD OF THE INVENTION

This invention relates to an attestation apparatus, system, and method for ensuring the integrity of embedded system machine code. More particularly, this invention relates to attesting machine code running on embedded systems via a companion processor with unimpeded access to the memory locations from which the primary processor accesses its machine code instructions.

BACKGROUND OF THE INVENTION

Attestation generally refers to a process for verifying the integrity of computer software and hardware. As a cyber protection technique, its goal is to ensure that software and hardware have not been altered as compared to trusted "gold standard" versions.

A significant disadvantage of many types of cyber protection techniques that do not implement attestation is that they are only able to identify cyber-attacks that are actively impacting—or have already impacted—a system. With such techniques, a dormant cyber-attack that is waiting for a trigger can only be detected and countered after it has been triggered. At that point, the damage from the attack may have already occurred.

Software attestation specifically refers to the verification of software, particularly the machine code used to execute a software program or application. As the term is used herein, "machine code" is a representation of program or application instructions. Such code can sometimes be used by embedded systems. Embedded systems are computer systems with dedicated functions that are often a part of a larger system, whether it be a mechanical, computer, software, or cyber-related system. Embedded systems may be found in industrial control systems, medical devices, automobiles, and as a part of other critical applications. In such applications, detection of compromise or malicious activity is a high priority. Despite the critical nature of these embedded systems, they often lack security guards against malicious attacks.

Typical software attestation protocols rely on a challenge-response process by which a trusted external verifier sends a request to a client and receives a response. The content—and potentially the timing—of the response indicates to the verifier whether the embedded system may be compromised. The client generates the response by computing a checksum over specified memory contents. Current attestation methods run at start-up or during periods of program inactivity. The present invention uses the FPGA, which is better isolated and/or delayed from malware infection as the malware must travel from the external source (web/internet), through the processor and memory (on chip or off chip) before reaching the FPGA. With the present invention's active monitoring, malware is detected real time, before it can reach the FPGA and in at least one embodiment, before it can do further damage to the system.

Because embedded systems typically have their own processor, a software-only attestation solution often uses the embedded system's processor to verify the machine code. The processor, however, can be subject to possible manipulation of the memory in which the machine code resides. As such, when compromised, the malicious code may be capable of evading an attestation attempt by manipulating the system's memory so that a correct attestation response is provided for the compromised system. These operations take time, which is one reason timing can be a critical factor in attestation. In order to reduce the possibility of malware evasion through memory manipulation, the attestation algorithm is typically time-optimized to ensure that another processor available to the malware could not compute the attestation response in less time, leaving time to manipulate the memory during the brief request period.

But even software-only attestation solutions that consider timing have drawbacks. Software-only attestation solutions typically require halting all functionality of the processor while attestation is performed. Many embedded systems operate continuously, restarting only upon a failure. Because a processor has a critical function to perform, disabling the processor functionality while performing attestation is often unacceptable, and generally prevents software-only attestation solutions from being performed continuously during the embedded system's runtime operation. This leaves the embedded system vulnerable to machine code changes that may be nefariously installed after startup.

Hardware-only attestation solutions, meanwhile, require custom-built hardware components that may be prohibitively expensive or create additional integration challenges. Thus, hybrid attestation solutions are desirable to the extent they are feasible, cost-effective, and able to detect and stop attacks before they execute or are able to avoid detection by manipulating system memory. What is needed, therefore, is a method to attest machine code at runtime, without system interruption, in embedded systems.

SUMMARY OF THE INVENTION

Embodiments of the invention described herein use a microcontroller and a reprogrammable logic device, such as a field-programmable gate array (FPGA), to implement a hybrid attestation solution that provides the assurances and benefits of a hardware-only solution without requiring custom-built hardware components having the drawbacks above. In the embodiment disclosed herein, attestation is performed periodically, perhaps continuously, at runtime and in less execution time for a given attestation request than is typically possible in software-only approaches, while also not requiring any halt of the processor in the microcontroller. This is achieved because the attestation algorithm is time-optimized to run in the minimum possible time on the reprogrammable logic device, which is often significantly less time than what would be possible on a general purpose processor. As the term is used herein, "runtime" refers to the time when a program is running or active (being executed).

In preferred embodiments, the reprogrammable logic device performs attestation on the memory at only a memory device code location to generate the checksum result value, while the processor is executing the machine code. The reprogrammable logic device includes functionality to perform a verification operation, such as a checksum computation, as well as encryption and decryption functionality to communicate with a verifier. The verification operation is time-optimized to run in the reprogrammable logic device to complete computations quickly. In preferred embodiments, the reprogrammable logic device performs attestation on only the memory locations necessary to generate the requested checksum result value, while the processor continues to execute the machine code separately, and in parallel with the attestation activity.

The preferred procedure that is used to boot and configure the embodiments disclosed herein ensures a trusted initial state of the microcontroller and the reprogrammable logic device. In preferred embodiments, the reprogrammable logic device configures and subsequently programs the microcontroller. All machine code is attested by the reprogrammable logic device which communicates results to the verifier. The verifier reports with a pass/fail status of the response. The framework allows for extension to incorporate additional integrity checks, if and when such become available, to verify additional system properties and communicate via processor proxy.

Some embodiments of the invention provide a runtime active attestation apparatus for verifying the integrity of untrusted machine code residing in memory locations of a memory device. The active attestation apparatus includes an integrated circuit chip that includes a reprogrammable logic device and a microcontroller. The reprogrammable logic device is configured to:
  receive an attestation request comprising a nonce and indicating the memory locations to be attested,
  execute an attestation algorithm in response to the attestation request that performs a verification operation, such as by generating a checksum result value to verify the integrity of the untrusted machine code residing in the memory locations, and
  send an attestation response.

The microcontroller includes a processor that is configured to boot after the field-programmable gate array (logic device) has booted. The microcontroller accesses the untrusted machine code from the memory locations of the memory device, and executes the untrusted machine code while the attestation algorithm is continuously executed by the reprogrammable logic device.

The apparatus also includes a verifier, such as may be in communication with the reprogrammable logic device via a communication network. The verifier is configured to send the attestation request to the reprogrammable logic device, receive and analyze the attestation response from the reprogrammable logic device, and report a pass/fail condition.

In some embodiments, the attestation algorithm comprises a combination of ADD (addition) and XOR (exclusive or) operations performed on various memory locations of the memory device to generate (obtain) the checksum result value.

In some embodiments, the reprogrammable logic device periodically or continuously runs the attestation algorithm to continuously verify that the machine code residing in the memory locations of the memory device has not been altered.

In some embodiments, the attestation algorithm is able to access the memory locations of the memory device without detection by the processor of the microcontroller because the reprogrammable logic device and the microcontroller share direct access, via the memory controller, to the memory locations.

In some embodiments, the reprogrammable logic device comprises a field-programmable gate array (FPGA). In other embodiments, the reprogrammable logic device comprises an application specific integrated circuit (ASIC).

In some embodiments, the integrated circuit chip and the memory device are components of a System-on-Chip (SoC) device that implements the embedded system.

In some embodiments, the processor of the microcontroller comprises an Advanced Reduced Instruction Set Computer (RISC)/Machine (ARM) processor.

In some embodiments, the verifier and the reprogrammable logic device communicate directly with each other via a communication bus, such as using a universal asynchronous receiver-transmitter (UART) protocol, or via a communication network such as the Internet via TCP/IP.

In some embodiments, the reprogrammable logic device creates the checksum result value only for the memory locations of the memory device in which the machine code resides.

In some embodiments, the reprogrammable logic device is configured by a trusted bitstream. The bitstream may be encrypted.

In some embodiments, the role of the reprogrammable logic device could be accomplished via a custom built trusted ASIC which shares, with the microcontroller, direct access to the memory via the memory controller.

In some embodiments, the microcontroller includes an embedded memory controller, and the reprogrammable logic device communicates directly with the memory device through the embedded memory controller.

In another aspect, embodiments of the invention provide an active attestation apparatus for verifying the integrity of untrusted machine code of an embedded system residing in a memory device. The active attestation apparatus of these embodiments includes a reprogrammable logic device disposed on an integrated circuit chip and a processor disposed on the same integrated circuit chip. The reprogrammable logic device is configured by a processor preloader that is downloaded to the reprogrammable logic device via a trusted bitstream (encrypted bitstream). The processor downloads the processor preloader from the reprogrammable logic device, is booted by the processor preloader to a trusted state, downloads the untrusted machine code from a non-volatile storage location to the memory device, and executes the untrusted machine code. As the processor executes the untrusted machine code, the reprogrammable logic device executes an attestation algorithm over the memory locations of the memory device from which the processor downloaded the untrusted machine code.

In yet another aspect, embodiments of the invention provide an attestation query method that is performed by a reprogrammable logic device of a system-on-chip. The method ensures the integrity of untrusted machine code executed by a processor. The method includes the following steps:
  (a) receiving an attestation request, including a nonce, from a verifier;
  (b) performing a verification operation, such as a checksum computation, over the memory locations of the memory device in which the untrusted machine code resides, wherein the checksum computation is performed using the nonce;

(c) generating a checksum result value based on the checksum computation; and (d) sending the checksum result value to the verifier.

BRIEF DESCRIPTION OF THE DRAWINGS

Other embodiments of the invention will become apparent by reference to the detailed description in conjunction with the figures, wherein elements are not to scale so as to more clearly show the details, wherein like reference numbers indicate like elements throughout the several views, and wherein.

DETAILED DESCRIPTION OF THE INVENTION

Figure 1:
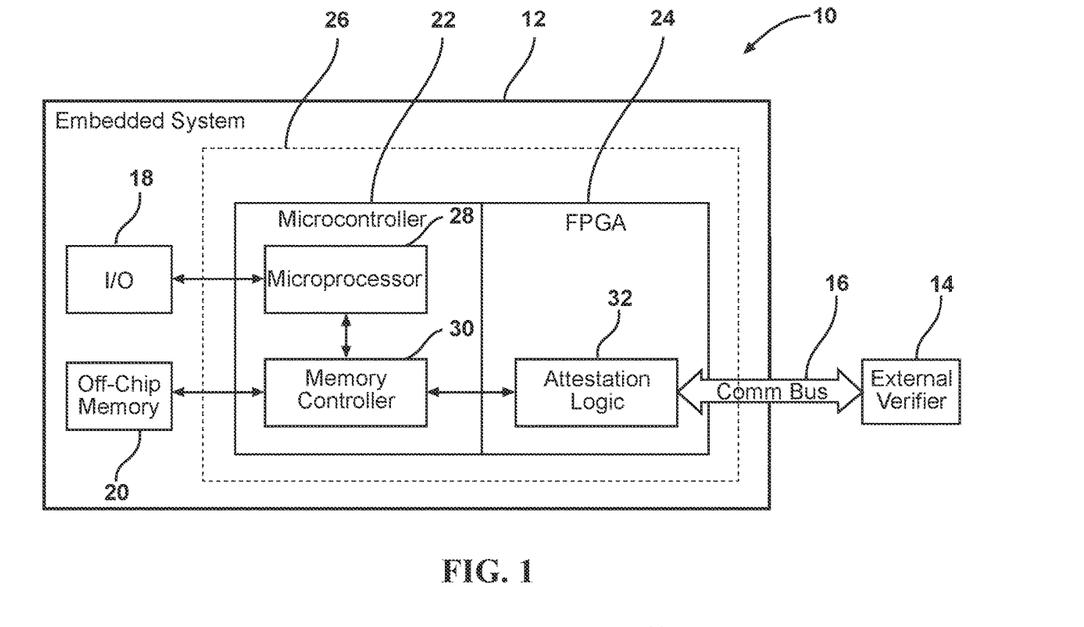
FIG. 1 depicts a functional block diagram of an operably connected active attestation apparatus according to an embodiment of the invention.

As depicted in FIG. 1, an embodiment of an active attestation apparatus 10 includes an embedded system 12 that communicates (communicating also referred to as operably connected) directly with a verifier 14 via a communication bus 16. In a preferred embodiment, the embedded system 12 comprises a system-on-chip (SoC) device, such as the Cyclone® V device, that includes an I/O interface 18 for communicating with hardware systems (e.g., switches and LEDs) and memory 20 for storage of the application's machine code. As understood by one of ordinary skill in the art, a system-on-chip (SoC) is a single microchip device that integrates all the necessary electronic components of a computer processor or other electronic system. The embedded system 12 also includes a microcontroller 22 and a reprogrammable logic device 24 that are physically and electrically integrated together on a single integrated circuit chip 26. In some embodiments, the memory device 20 does not reside on the same integrated circuit (IC) chip 26 as the microcontroller 22 and the reprogrammable logic device 24, and in those embodiments the memory device 20 is referred to as an off-chip memory device. The reprogrammable logic device 24 executes attestation logic 32 as described in more detail hereinafter. The microcontroller 22 preferably includes a processor 28, such as an Advanced Reduced Instruction Set Computer (RISC) or Machine (ARM) processor, and a memory controller 30.

In a preferred embodiment, the reprogrammable logic device 24 comprises a field-programmable gate array (FPGA) into which the attestation logic 32 is programmed by a trusted or encrypted bitstream as described in more detail hereinafter. In an alternative embodiment, the reprogrammable logic device 24 comprises an application specific integrated circuit (ASIC) that has the attestation logic 32 integrated within.

In preferred embodiments, the verifier 14 comprises a processing device or computer processor that is external to the integrated circuit chip 26. In some embodiments, the verifier comprises a single-board computer, although other types of computer systems or processing devices could be employed in other embodiments. In such embodiments in which the verifier 14 is external to the chip 26, the communication bus 16 implements UART communication protocol for direct communications between the verifier 14 and the reprogrammable logic device 24, although other communication protocols may be used in other embodiments.

In embodiments in which the verifier 14 is provided on the chip 26, a trusted copy of the machine code (i.e., a "golden copy") could be programmed into the reprogrammable logic device 24, and attestation operations could be wholly performed within the reprogrammable logic device 24. In that approach, encryption could be used to provide the attestation results to an external entity. Encryption can be accomplished within the FPGA based on locally stored and protected key or keys (built-in key or keys) such that attestation results can be securely communicated via an untrusted network. Alternatively or in addition, if the attestation query fails, an internal system interrupt could be generated by the reprogrammable logic device, or an encrypted message could be generated and sent by the reprogrammable logic device to an I/O device indicating that that system integrity is suspect.

Figure 3:
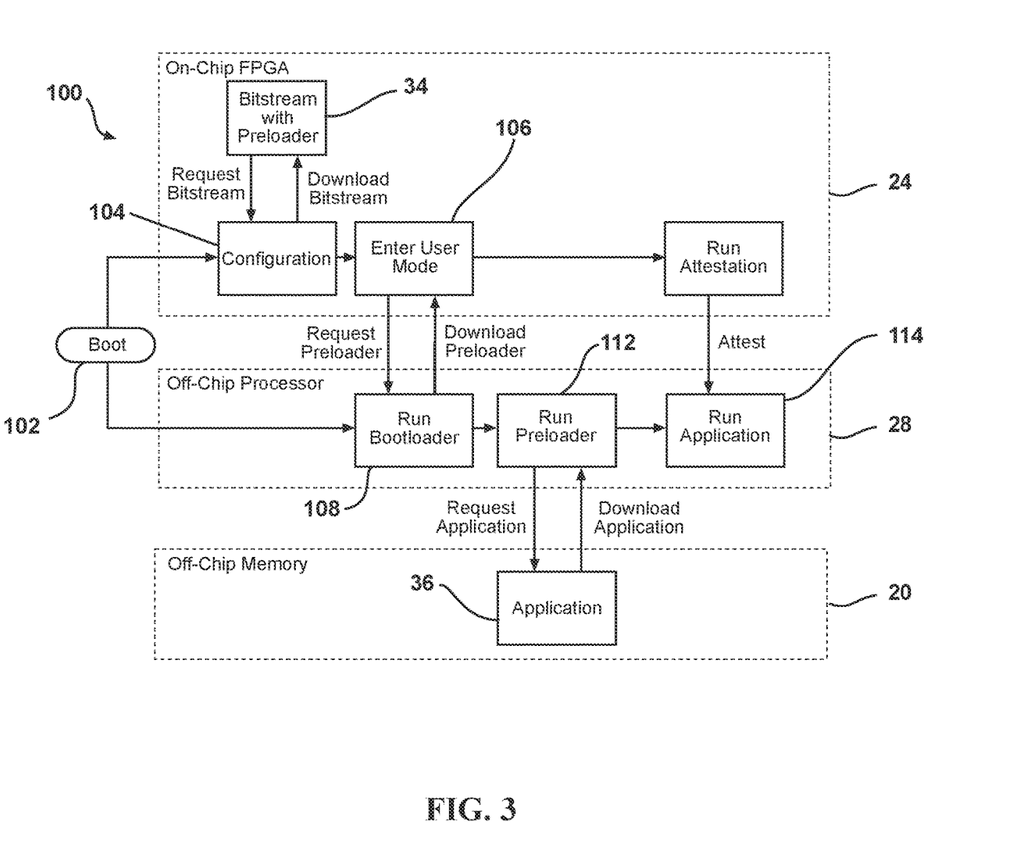
FIG. 3 depicts a flow diagram of an attestation configuration procedure according to an embodiment of the invention.
Figure 4:
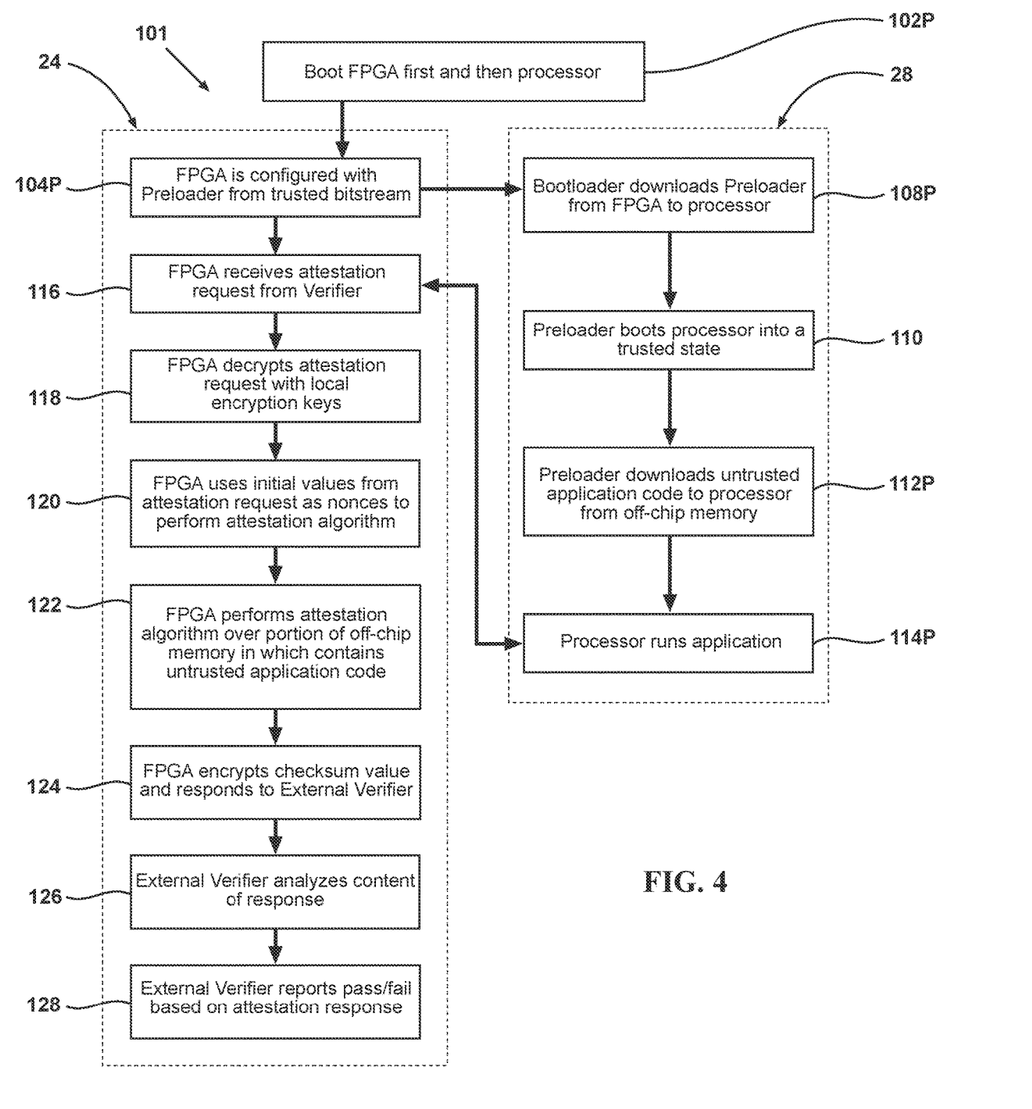
FIG. 4 depicts a flow diagram of an attestation process according to an embodiment of the invention.

FIG. 3 and FIG. 4 depict exemplary processes 100 and 101 respectively for securely booting and configuring of the embedded system 12. The structural process of FIG. 3 numerical identifiers have matching/corresponding process step identifiers in FIG. 4 to facilitate understanding of the hardware & process relationship.

FIG. 3 illustrates exemplary processes 100 for securely booting and configuring of the embedded system 12 of FIG. 1, including setting the hardware configuration to ensure that the reprogrammable logic device 24 such as a FPGA cannot be reprogrammed by the processor 28. Without this safeguard, if the processor has the ability to reprogram the reprogrammable logic device, then, if compromised, the processor could load a modified program into the reprogrammable logic device capable of redirecting attestation requests to other portions of memory, thereby thwarting the primary objective of performing attestation on the machine code being used to instruct the primary processor.

FIG. 3 depicts an embedded system process or also referred to as a securing booting process 100 by which the initial step of booting the system 102 is followed by simultaneous or in parallel actions on both the reprogrammable logic device 24 as well as the processor 28. Following the initial boot, the reprogrammable logic device 24 is configured (programmed) by a preloader 104.

The preloader is hosted by a trusted or encrypted bitstream 34. The trusted bitstream 34 is a programming tool that is loaded into the reprogrammable logic device 24 to configure the reprogrammable logic device 24 to perform its intended function, which in this case is attestation. In general terms, the trusted bitstream 34 configures programmable logic blocks and interconnects within the programmable logic device 24 to form logic circuits. Here, the trusted bitstream 34 is "trusted" because it is an encrypted bitstream and/or alternatively the bitstream is maintained isolated from chip memory 20 by the processor 28. Thereby protecting the trusted bitstream from external manipulation or tampering. Following configuration of the reprogrammable logic device 24, the reprogrammable logic device 24 enters a User Mode 106. Once User Mode 106 is entered, bootloader 108 for the processor 28 then requests and downloads the preloader 104 from the reprogrammable logic device 24.

The on-chip processor 28 preloader 112 (software) downloads an application 36 from an off-chip memory 20. Once the preloader 112 has the application code 36, the processor 28 runs 114 the application/machine code 36, 114. While the machine code (application) 36 is running 114, the attestation process is simultaneously operating to gather attestation data. The attestation process tests the running (active) software at least 500 times per second and in one embodiment at least 1,000 times per second, while the application is running (active) and without more than 10% and in one embodiment less than 1% degradation in the application run time operational performance.

FIG. 4 depicts one embodiment of a process 101 flow of FIG. 1 and/or FIG. 3 where the reprogrammable logic device 24 is an FPGA and the micro-controller 24 is a processor that run together over 500 times per second or alternatively over 1,000 times per second to continuously validate the micro-controller/processor memory code WHILE the code is running and performing its designed operating function. As illustrated in FIG. 4, upon Booting 102P, the FPGA is configured with a Preloader from the trusted bit stream 104P. The bootloader then downloads the preloader from the FPGA to the processor 108P. The preloader then boots the processor into a trusted state 110. The preloader from FIG. 3 also downloads untrusted machine code to the processor from the memory device 112P where the processor then runs the application/machine code 114P.

In parallel and/or simultaneously with the processor operations above, FIG. 4 illustrates the process of verification where the FPGA receives an attestation request from the verifier 116. When desired and optionally, the FPGA may decrypt the attestation request with a local encryption key. The attestation request 116 may include a nonce value wherein the reprogrammable logic device extracts the nonce value from the attestation request 116. From there, the reprogrammable logic device (FPGA) process uses the nonce value from the attestation request to perform the attestation algorithm 120. In one embodiment the attestation may be over the memory location(s) of the memory device which contain potentially untrusted application code 122. Once the attestation algorithm has been run, a checksum value is encrypted by the FPGA and sent back to the verifier 124. The verifier then receives and analyzes the content of the attestation response 126 and reports with a pass/fail based upon those results 128. This report is based on the content of the response after the external verifier has analyzed the content. The pass or fail may result in a report, a notice to the process operator, or automatically generate some other action such as shutting down the processor.

In one embodiment the processor bootloader requests and downloads to the preloader from the reprogrammable logic device, after which the preloader boots the processor 28 into a trusted state 110 in which the processor 28 is not able to reprogram the reprogrammable logic device 24. While this is happening, the preloader also downloads untrusted machine code to the processor from the memory device 112P where the processor then runs the machine code 114P.

As shown in FIG. 3, when configured 104 by the trusted bitstream, the reprogrammable logic device contains attestation logic that implements an attestation algorithm that has direct and unimpeded access to the memory device through the memory controller. In an alternative embodiment, the attestation logic accesses the memory device via a secondary memory port having an independent memory controller (not shown).

To begin the attestation process of FIG. 4, the reprogrammable logic device receives an attestation request 116 from the verifier (14 in FIG. 1) that includes a nonce value, and the reprogrammable logic device extracts (and/or decrypts) 118 the nonce value from the attestation request. The reprogrammable logic device (24 in FIG. 1) uses 120 the nonce value from the attestation request to perform the attestation algorithm 122 over the memory location(s) of the memory device (20 from FIG. 1) from which the processor runs 122 the untrusted machine code. Use of the nonce value can make it more difficult to compromise the system because each verification request results in a different correct response, even if the request covers the same memory locations. The nonce value may thus be desirable in preferred embodiments as it can nearly eliminate attempts to defeat the attestation algorithm by pre-computing and storing potential responses.

The embedded system 12 in FIG. 1 may be designed in one embodiment with a hardware configuration to ensure that the reprogrammable logic device 24 cannot be reprogrammed by the processor 28. Without this safeguard, if the processor has the ability to reprogram the reprogrammable logic device, then, if compromised, the processor could load a modified program into the reprogrammable device capable of redirecting attestation requests to other portions of memory, thereby thwarting the primary objective of performing attestation on the machine code being used to instruct the primary processor.

In the booting process, the first step is configuring (programming) the reprogrammable logic device by a preloader that is hosted by a trusted bitstream 34 (steps 102 and 104). The trusted bitstream 34 is a programming tool that is loaded into the reprogrammable logic device to configure the reprogrammable logic device to perform its intended function, which in this case is attestation. In general terms, the bitstream 34 configures programmable logic blocks and interconnects within the programmable logic device 24 to form logic circuits. In this case, the bitstream 34 is "trusted" because it is encrypted and thereby protected from external manipulation or tampering. In some embodiments, the trusted bitstream 34 originates from an external non-volatile memory source. In other embodiments, the trusted bitstream 34 originates from an internal non-volatile memory device that is on the chip 26. In still other embodiments, the trusted bitstream can be provided by the verifier 14 to the reprogrammable logic device 24 over a communication network, such as the bus 16. In such embodiments, the verifier 14 can be configured with appropriate encryption and decryption keys to securely communicate with the reprogrammable logic device 24. In embodiments implemented in SoC's, the preloader may be contained within the bitstream 34 so that the preloader is also trusted.

After configuration by the trusted bitstream (step 104), the reprogrammable logic device 24 enters a "User Mode" (step 106). As part of the User Mode, bootloader for the processor 28 then requests and downloads the preloader from the reprogrammable logic device 24 (step 108), and the preloader boots the processor 28 into a trusted state in which the processor 28 is not able to reprogram the reprogrammable logic device 24 (step 110). The preloader also downloads untrusted machine code 36 to the processor 28 from the memory device 20 (step 112), and the processor 28 runs the machine code 36 (step 114).

When configured by the trusted bitstream (step 104), the reprogrammable logic device 24 contains attestation logic 32 that implements an attestation algorithm that has direct and unimpeded access to the memory device 20 through the memory controller 30. In an alternative embodiment, the attestation logic 32 accesses the memory device 20 via a secondary memory port having an independent memory controller. To begin the attestation process, the reprogrammable logic device 24 receives an attestation request from the verifier 14 that includes a nonce value (step 116), and the reprogrammable logic device 24 extracts the nonce value from the attestation request (step 118). The reprogrammable logic device 24 uses the nonce value from the attestation request (step 120) to perform the attestation algorithm over the memory location(s) of the memory device 20 from which the processor 28 runs the untrusted machine code 36 (step 122). Use of the nonce value can make it more difficult to compromise the system because each verification request results in a different correct response, even if the request covers the same memory locations. The nonce value may thus be desirable in preferred embodiments as it can nearly eliminate attempts to defeat the attestation algorithm by pre-computing and storing potential responses.

In the preferred embodiment, the attestation algorithm implemented in the attestation logic 32 configured in the FPGA 24 directly accesses the memory location(s) of the memory device 20 independently from the processor 28, and therefore performs the attestation algorithm without being detected by the processor 28. Thus, if malware is running on the processor 28, the malware would not be able to detect that attestation is ongoing in the memory location(s), and would not be able to hide its "infected" instruction code through memory manipulation.

Also in the preferred embodiment, the attestation algorithm implements a verification operation, such as an operation comprising a combination of ADD and XOR operations performed on the targeted memory location(s) to generate (obtain) the checksum result value.

Figure 2:
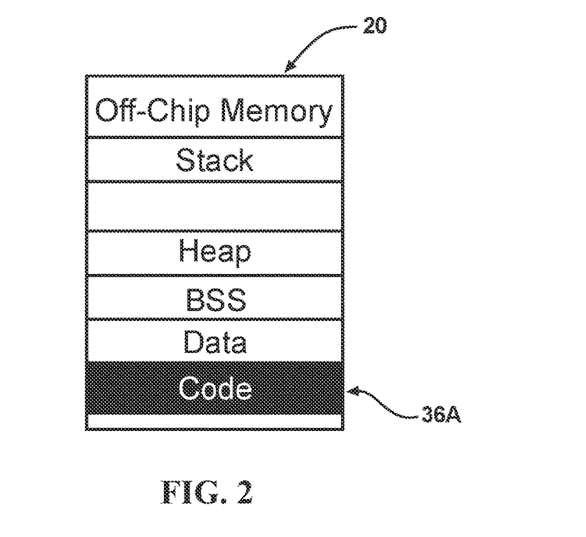
FIG. 2 depicts a memory device on which an attestation process is performed according to an embodiment of the invention.

As shown in FIG. 2, the attestation logic 36A (algorithm) is in at least one embodiment performed only over the code segment of the memory device 20, and the other data software segments in the memory device 20 are omitted from attestation. While running, the embedded system is operating and performing its intended task. These other untested segments may include off-chip memory, the Stack, the Heap, and the like. Data segments typically change during normal operation, and therefore have no standard to attest against. In order to execute as quickly as possible, the algorithm preferably uses the largest bus size to read memory values. The values are then provided to the attestation logic, which performs a series of ADD and XOR operations, beginning with the nonce, in order to create a non-associative computation of the checksum result value. To arrive at the correct result, the operations must be performed in a sequence. Because the operations must be performed in a sequence, they are non-parallelizable, which further complicates malware evasion techniques.

As the term is used herein, a parallelizable operation is a computational operation that can be broken down into smaller portions, each of which can be computed independently and simultaneously, and then recombined for a final result. In contrast, a non-parallelizable operation refers to computational operation for which there is no time advantage gained by performing portions of the operation in parallel, such as in separate processors. For example, if each separate portion of a computational operation depends on the output of a previous portion, then they must be performed in sequence, even if they are performed in separate processors. In that situation, splitting the computational operation into separate parallel portions does not result in less overall computation time. Thus, such as operation is referred to as non-parallelizable.

If the attestation algorithm could be parallelized, then theoretically an attacker (malware) could enlist the help of several parallel processors to compute and return a correct checksum result in time.

However, because the attestation computation of the preferred embodiment is non-parallelizable, no computation can begin until the nonce is available. If a nonce was not used, and an attacker knew the attestation algorithm in advance, and knew what the memory was supposed to look like, then the attacker could theoretically precompute all possible attestation responses and store them for purposes of defeating attestation attempts. Upon receiving a request, the attacker's malware could do a comparative assessment of possible values and, based on the initial conditions, return a correct response, even though the machine code had been completely changed. Use of a nonce eliminates that possibility because the attacker would have to precompute more results than would be possible to store.

After completing the checksum computation, the reprogrammable logic device 24 sends the checksum result value to the verifier 14 (step 124). The verifier 14 receives and analyzes the content of the attestation response (step 126) and reports with a pass/fail based on the content of the response (step 128).

Thus, it will be appreciated that embodiments of the invention implement a secure boot and attestation process that provides multiple layers of defense against a malware attack. The first defense is booting the processor 28 into a trusted state so that interference with attestation operations can be avoided. The second and ongoing defense is ensuring that the machine code in the memory 20 has not been altered by malware through operation of the active attestation apparatus. In that aspect, it might be assumed that the processor could be compromised. Otherwise, attestation would not be necessary. If the processor 28 can be compromised, then consideration is given to the ability of the compromised processor to thwart attestation requests. If the processor could detect an inbound attestation request, then it could possibly react in some way. However, if the processor cannot even detect that an attestation request has been made, a compromised processor is severely limited in its ability to react. Thus, the ability to perform attestation operations without alerting the processor is desirable.

In some embodiments, the checksum may be substituted for additional modules to execute proven checksum algorithms or directly compare instruction memory. This framework allows for simple alterations to complete attestation in multiple ways, according to the expected threat.

Although the preferred embodiment of the attestation algorithm uses a combination of ADD and XOR operations, other verification operations could be implemented in other embodiments, such as a Secure Hash Algorithm (SHA) or direct memory comparison. Also, in alternative embodiments, the algorithm that calculates the checksum may be another time-optimized, one-way, non-parallelizable function instead of the time-optimized, one-way, non-parallelizable algorithm of the preferred embodiment.

In some alternative embodiments, attestation of dynamic properties may be completed in addition to attestation of static machine code. This activity assumes that the verifier knows what the dynamic state of the memory ought to be, which may not always be knowable, but may be predetermined in very specific situations for which attestation would prove useful. For example, if the data were known to be bounded by some limits, such as a maximum sensor value, the attestation algorithm could perform boundary checks to ensure the sensor data conforms to the expected bounds. In this case, attestation provides some value, although the algorithm would be unable to declare whether the data were truly "correct."

The foregoing description of preferred embodiments for this invention have been presented for purposes of illustration and description. They are not intended to be exhaustive or to limit the invention to the precise form disclosed. Obvious modifications or variations are possible in light of the above teachings. The embodiments are chosen and described in an effort to provide the best illustrations of the principles of the invention and its practical application, and to thereby enable one of ordinary skill in the art to utilize the invention in various embodiments and with various modifications as are suited to the particular use contemplated. All such modifications and variations are within the scope of the invention as determined by the appended claims when interpreted in accordance with the breadth to which they are fairly, legally, and equitably entitled.

What is claimed is:

1. An active attestation apparatus for verifying the integrity of untrusted machine code comprising:
an integrated circuit chip comprising:
a reprogrammable logic device having a built-in encryption key, the reprogrammable logic device operable upon boot to receive an encrypted bitstream that programs and configures the reprogrammable logic device, and operable thereafter to receive an attestation request, execute an attestation algorithm in response to the attestation request that generates a checksum result value to verify the integrity of the untrusted machine code residing in memory locations of a memory device, and send an attestation response; and
a microcontroller including a processor that is configured to boot after the reprogrammable logic device has booted, access the untrusted machine code from the memory locations of the memory device, and execute the untrusted machine code while the attestation algorithm is periodically executed by the reprogrammable logic device; and
a verifier in communication with the reprogrammable logic device via a communication network, the verifier configured to send the attestation request to the reprogrammable logic device, receive and analyze the attestation response from the reprogrammable logic device, and report a pass/fail condition.

2. The active attestation apparatus of claim 1 wherein the attestation algorithm comprises a combination of ADD and XOR operations performed on the memory device at only a memory device code location to generate the checksum result value.

3. The active attestation apparatus of claim 1 wherein the reprogrammable logic device periodically runs the attestation algorithm to verify that the machine code residing in the memory locations of the memory device has not been altered.

4. The active attestation apparatus of claim 1 wherein the attestation algorithm accesses the memory locations of the memory device without interruption of, or detection by, the processor of the microcontroller.

5. The active attestation apparatus of claim 4 wherein the reprogrammable logic device verifies the integrity of the untrusted machine code residing in memory locations while the untrusted machine code is active.

6. The active attestation apparatus of claim 5 wherein the reprogrammable logic device comprises a field-programmable gate array, an application specific integrated circuit or a combination thereof.

7. The active attestation apparatus of claim 1 wherein the integrated circuit chip and the memory device are components of a System-on-Chip (SoC) device that implements an embedded system.

8. The active attestation apparatus of claim 1 wherein the processor of the microcontroller comprises an Advanced Reduced Instruction Set Computer (RISC).

9. The active attestation apparatus of claim 1 wherein the verifier and the reprogrammable logic device communicate directly with each other via the communication network using a universal asynchronous receiver-transmitter (UART) protocol.

10. The active attestation apparatus of claim 1 wherein the memory locations of the memory device comprise code segments and data software segments, and wherein the reprogrammable logic device obtains the checksum result value only on the code segments, thereby avoiding interruption of the data software segments while the attestation algorithm is executing.

11. The active attestation apparatus of claim 1 wherein the reprogrammable logic device is configured by a trusted bitstream.

12. The active attestation apparatus of claim 1 wherein the microcontroller includes an embedded memory controller, and the reprogrammable logic device communicates directly with the memory device through the embedded memory controller.

13. The active attestation apparatus of claim 1 wherein the verifier comprises a computer processor that is external to the integrated circuit chip.

* * * * *